W. D. OSBRON.
COTTON CHOPPER AND SCRAPER.
APPLICATION FILED DEC. 8, 1910.
995,553.
Patented June 20, 1911.
3 SHEETS—SHEET 1.
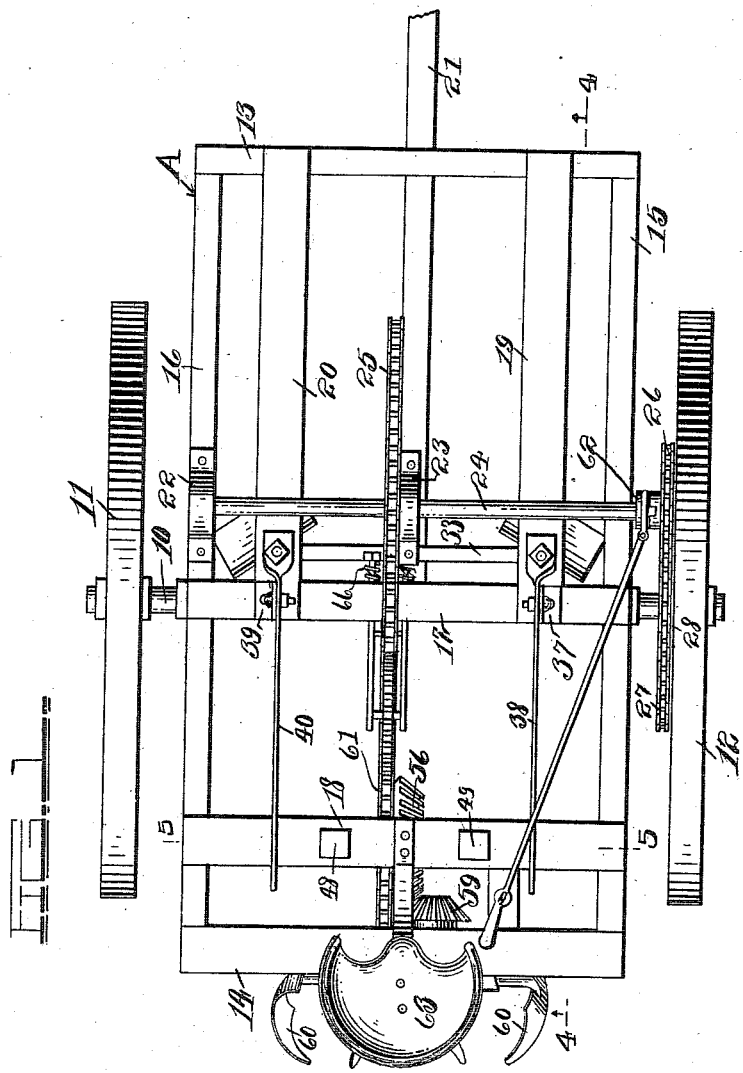
Witnesses
Inventor
William D. Osbron.
By
Attorneys

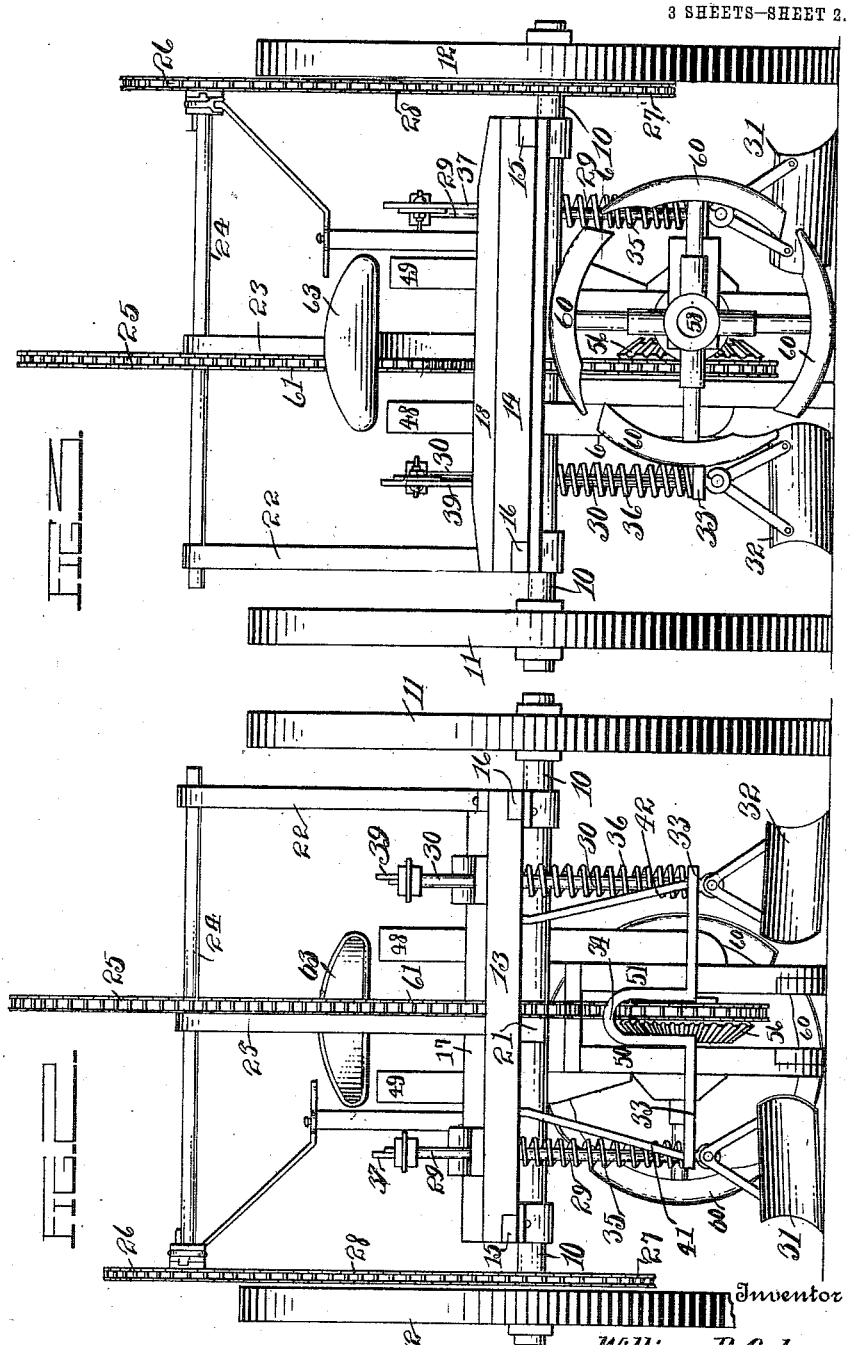

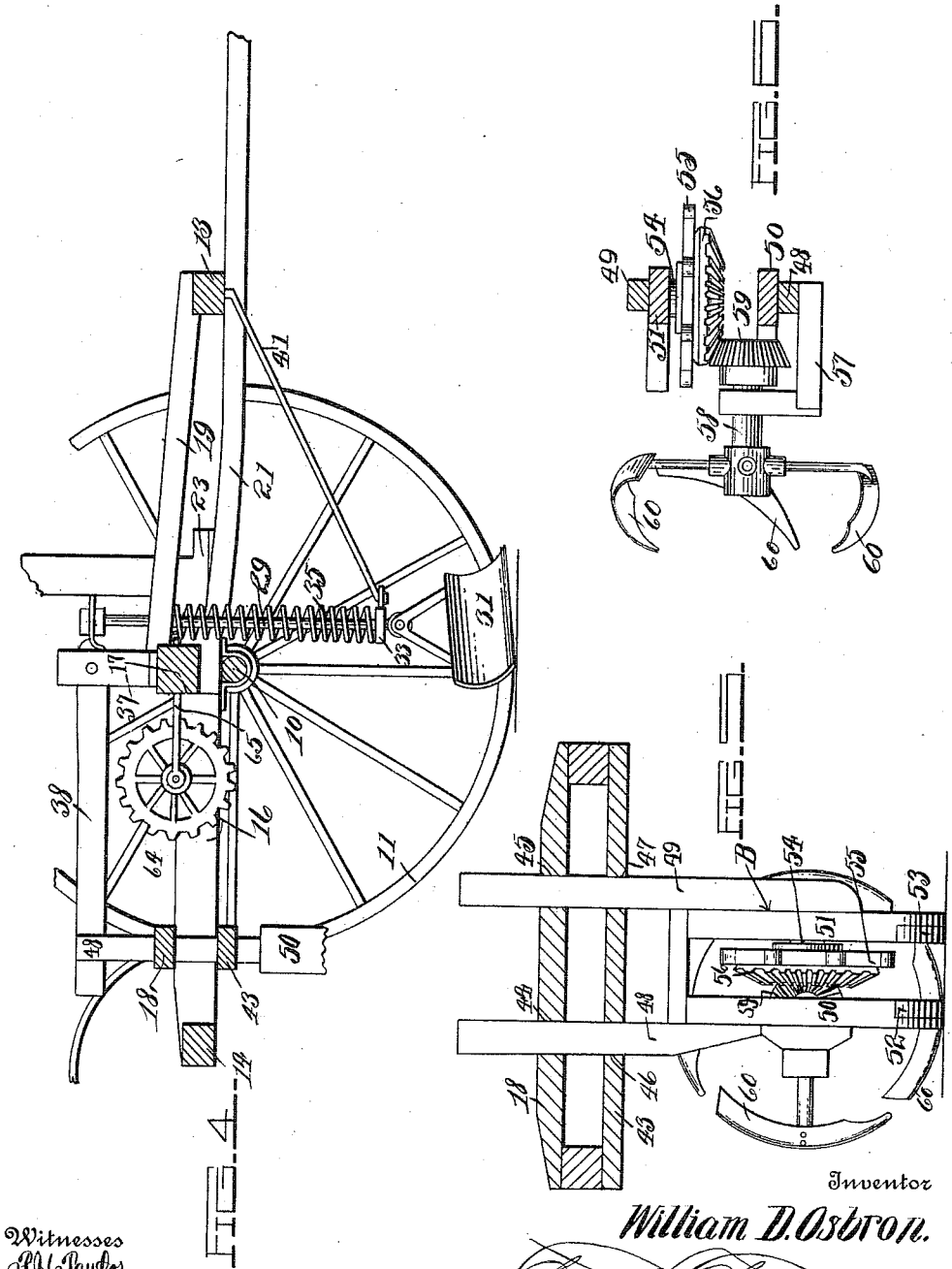

UNITED STATES PATENT OFFICE.

WILLIAM D. OSBRON, OF MURRAY, KENTUCKY.

COTTON CHOPPER AND SCRAPER.

995,553.  Specification of Letters Patent.  Patented June 20, 1911.

Application filed December 8, 1910. Serial No. 596,277.

*To all whom it may concern:*

Be it known that I, WILLIAM D. OSBRON, a citizen of the United States, residing at Murray, in the county of Calloway, State of Kentucky, have invented certain new and useful Improvements in Cotton Choppers and Scrapers; and I do hereby declare the following to be a full, clear, and exact description of the invention, such as will enable others skilled in the art to which it appertains to make and use the same.

This invention relates to cotton choppers and scrapers.

The object of the invention resides in the provision of a traction operated cotton chopper and scraper wherein the chopping element is so constructed and arranged that the same will be moved vertically to respond to the contour of the ground over which the device is passing irrespective of the contour of the ground with which the traction wheels are in engagement.

A further object of the invention resides in the provision of a device of the character named wherein the scraping elements are adapted for vertical movement and are yieldingly held against such movement.

A still further object of the invention resides in the production of a comparatively simple and inexpensive device which in practice will efficiently remove from the rows and destroy the surplus plants.

With the above and other objects in view, the invention consists in the details of construction and in the arrangement and combination of parts to be hereinafter more fully described and particularly pointed out in the appended claim.

In describing the invention in detail reference will be had to the accompanying drawings, wherein like characters of reference denote corresponding parts in the several views; and in which, Figure 1 is a plan view of a cotton chopper and scraper constructed in accordance with the invention; Fig. 2, a front end view of the invention; Fig. 3, a rear end view of same; Fig. 4, a fragmental longitudinal section on the line 4—4 of Fig. 1; Fig. 5, a section on the line 5—5 of Fig. 1; and Fig. 6, a section on the line 6—6 of Fig. 3.

Referring to the drawings, the invention is shown as comprising an axle 10, upon the ends of which are rotatably mounted traction wheels 11 and 12 respectively. Supported upon the axle 10 is a frame A which comprises end members 13 and 14 and side members 15 and 16. These side members are in turn connected by intermediate cross beams 17 and 18, while longitudinally disposed beams 19 and 20 connect the cross beam 17 and the end member 13. A tongue 21 has its inner end secured to the under face of the cross beam 17, while its intermediate portion is made fast to the end member 13. Rising from the side member 16 and the tongue 21 are standards 22 and 23 respectively, in the upper ends of which is journaled a shaft 24 disposed transversely of the machine. Fixed on the shaft 24 between the uprights 22 and 23 is a sprocket wheel 25, while another sprocket wheel 26 is loosely mounted on the end of the shaft 24 which is disposed adjacent the standard 23. Fixed to the wheel 12 and rotatable on the axle 10 is a sprocket wheel 27 which lies in substantially the same vertical plane with the sprocket wheel 26, and a sprocket chain 28 travels on the sprocket wheels 26 and 27 so that the rotation of the traction wheel 12 will in turn cause the shaft 24 to rotate. Mounted in the longitudinal beams 19 and 20 for a vertical movement are rods 29 and 30 respectively, said rods carrying at their lower ends scraper blades 31 and 32 respectively. A bridge bar 33 has its ends slidably mounted respectively on the rods 29 and 30 and the central portion of this bridge bar is formed U shaped, as at 34, so as to permit the same to pass over the cotton rows during the operation of the machine. A spring 35 encircles the rod 29 and has one end in engagement with the bridge bar 33 and its other end in engagement with the longitudinal beam 19. Another spring 36 encircles the rod 30 and has one end in engagement with the bridge bar 33 and its other end in engagement with the longitudinal beam 20. By this construction, it will be apparent that the scraper blades 31 and 32 are yieldingly held against vertical movement, the springs 35 and 36 being designed of sufficient strength for the desired engagement with the earth.

Secured to the cross beam 17 at the rear of the longitudinal beam 19 is a journal bracket 37 which has pivoted thereto a lever 38; the forward end of said lever being in turn operatively secured to the upper end of the rod 29 so that by the actuation of said lever, the rod and scraper carried thereby may be raised vertically against the influence of the spring 35. Likewise, another journal bracket 39 is secured to the cross beam 17 at the rear of the longitudinal beam 20 and pivoted to this journal bracket is a lever 40, one end of which is operatively connected to the upper end of the rod 30 so that said rod and the scraper carried thereby may be raised vertically against the influence of the spring 36.

In order to prevent the bridge bar 34 and the lower ends of the rods 29 and 30 from moving longitudinally of the machine during its operation, one end of said bridge bar is connected to the end member 13 by means of a rod 41, while the other end of said bridge bar is likewise connected to the end member 13 by a rod 42.

Secured to the lower side of the side members 15 and 16 directly beneath the cross beam 18 is another cross beam 43. The cross beam 18 is provided with spaced openings 44 and 45, while the cross beam 43 is likewise provided with spaced openings 46 and 47 in alinement with the openings 44 and 45 respectively in the beam 18. Mounted for vertical movement in the openings 44 and 46 is a guide member 48, while a corresponding guide member 49 is mounted for vertical movement in the openings 45 and 47. Supported between the guide members 48 and 49 is an inverted U shaped frame B which includes the side arms 50 and 51 which terminate respectively in angular portions 52 and 53 forming runners for engagement with the ground during the travel of the machine. Journaled between the arms 50 and 51 is a shaft 54, upon which is fixed a sprocket wheel 55 and a bevel gear 56. Secured to the arm 51 is an L shaped bracket 57, one arm of which extends transversely of the arms 50 and 51 at the rear of the latter and has journaled therein a shaft 58. Mounted on one end of the shaft 58 is a bevel gear 59 which meshes with the bevel gear 56 carried by the shaft 54 so that the rotation of the shaft 54 will produce a corresponding rotation of the shaft 58. Mounted on the rear end of the shaft 58 upon the radially disposed arms 59 are a plurality of chopping blades 60. The sprocket wheel 55 is positioned so as to lie substantially in the same vertical plane as the sprocket wheel 25 and traveling on the latter and the sprocket wheel 55 is a sprocket chain 61. Splined upon the shaft 24 is a clutch 62 which is operated through the medium of suitable connections from the seat 63 so as to cause the sprocket wheel 26 to rotate in unison with the shaft 24 when desired.

From the foregoing, it is apparent that there has been produced a simple device adapted for the attainment of the ends in view, it being understood that in attaining these ends minor details in the details herein set forth may be resorted to without departing from the scope of the invention as set forth in the appended claim.

The sprocket chain 61 is maintained taut during the movement of the frame which carries the cotton chopper shaft by means of an idler 64 which is journaled in a frame 65, the latter being in turn slidably mounted in the cross beam 17. This frame is normally actuated to force the idler 64 in engagement with the sprocket chain 61 by means of springs 66.

What is claimed is:—

In a device of the character described, a wheeled body, a pair of spaced guide members having their upper ends slidably mounted in a body for vertical movement, an inverted U shaped frame secured between the lower ends of said guide members, the arms of which terminate in spaced runners for engagement with the ground, a shaft journaled between the arms of said inverted U shaped member, connections between said shaft and one of the wheels of said body, whereby the rotation of the wheel will rotate said shaft, a bevel gear fixed on said shaft between the arms of the inverted U shaped member, a bracket secured to one of the arms of the inverted U shaped member, a shaft journaled in said bracket, a bevel gear mounted on said shaft in engagement with the bevel gear mounted on the first named shaft, and a chopping element fixed on said second named shaft for rotation therewith.

In testimony whereof, I affix my signature, in presence of two witnesses.

WILLIAM D. OSBRON.

Witnesses:
R. S. CUTCHIN,
J. D. PURDOW.

---

Copies of this patent may be obtained for five cents each, by addressing the "Commissioner of Patents, Washington, D. C."